United States Patent [19]
Mikeska et al.

[11] Patent Number: 5,718,634
[45] Date of Patent: Feb. 17, 1998

[54] TORQUE LIMITING COUPLING

[75] Inventors: Felix Mikeska, Siegburg; Klaus Kämpf, Lohmar; Hans-Jürgen Langen, Frechen, all of Germany

[73] Assignee: GKN Walterscheid GmbH, Lohmar, Germany

[21] Appl. No.: 558,407

[22] Filed: Nov. 16, 1995

[30] Foreign Application Priority Data

Nov. 19, 1994 [DE] Germany ............ 44 41 218.5

[51] Int. Cl.$^6$ .................................................. F16D 7/06
[52] U.S. Cl. ........................................................ 464/37
[58] Field of Search .................................. 464/37, 38, 30, 464/64, 33, 36; 192/56.51, 56.5, 56.1

[56] References Cited

U.S. PATENT DOCUMENTS

| | | |
|---|---|---|
| 2,401,992 | 6/1946 | Waller . |
| 3,132,730 | 5/1964 | Dahlstrand et al. . |
| 4,041,729 | 8/1977 | Bilz ............................ 192/56.5 |
| 4,386,689 | 6/1983 | Kato ........................... 464/37 X |
| 4,468,206 | 8/1984 | Herchenbach et al. ............ 464/37 |
| 4,792,321 | 12/1988 | Lundquist ................... 464/37 X |
| 4,802,326 | 2/1989 | Geisthoff .................... 464/37 X |
| 4,848,547 | 7/1989 | Kampf ...................... 192/56.5 X |
| 5,342,241 | 8/1994 | Kampf ........................... 464/37 |
| 5,531,307 | 7/1996 | Fechter et al. ............ 192/56.5 X |

FOREIGN PATENT DOCUMENTS

| | | |
|---|---|---|
| 27 10 923 B1 | 5/1978 | Germany . |
| 33 15 750 C1 | 7/1984 | Germany . |
| 41 37 829 A1 | 5/1993 | Germany . |
| 1092683 | 11/1967 | United Kingdom . |
| 1239540 | 7/1971 | United Kingdom . |

Primary Examiner—Daniel P. Stodola
Assistant Examiner—Eileen A. Dunn
Attorney, Agent, or Firm—Harness, Dickey & Pierce, P.L.C.

[57] ABSTRACT

A torque limiting coupling (1) has a coupling sleeve (5), a coupling hub (2), and driving elements (12) settable between a torque transmitting position and a disconnected position. A switching ring (27) and loading balls (24) are provided which, in the torque transmitting position, load the driving elements (12) radially inwardly. If the driving elements (12) give way in their disconnected position, the balls (24) are pushed radially inwardly until the switching ring (27) is able to slide over the balls (24) and prevent them, via a bore portion, from displacing radially outwardly. This ensures that, if the coupling hub and coupling sleeve continue to rotate relative to one another, the driving elements (12) cannot re-engage the recesses and thus assume the torque transmitting position. If the switching ring (27) is displaced manually, it must be moved into a position wherein the balls (24) are again able to escape radially outwardly, thus enabling the driving elements (12) to engage the torque transmitting position. Thus, re-engagement is only possible if the switching ring (27) is moved from its disconnected position of the driving elements (12) into the torque transmitting position of the driving elements (12).

12 Claims, 7 Drawing Sheets

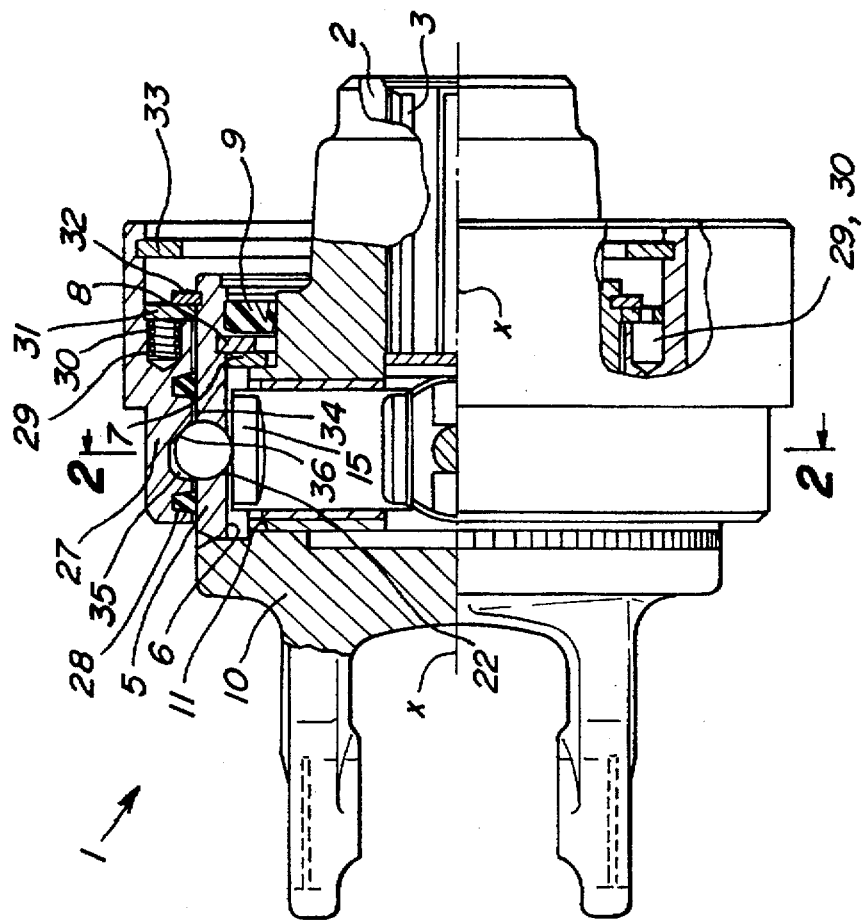
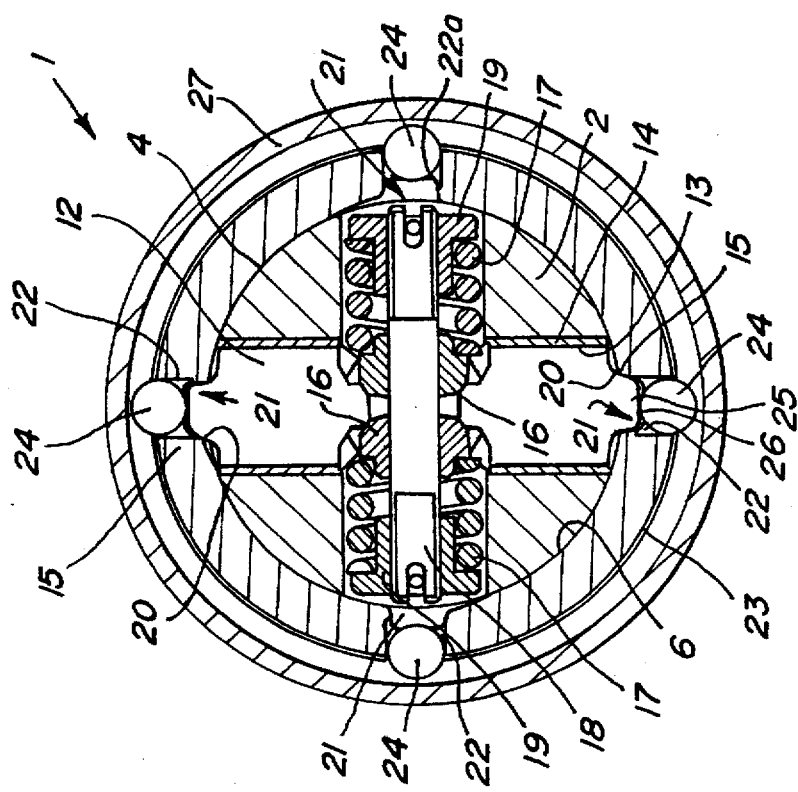

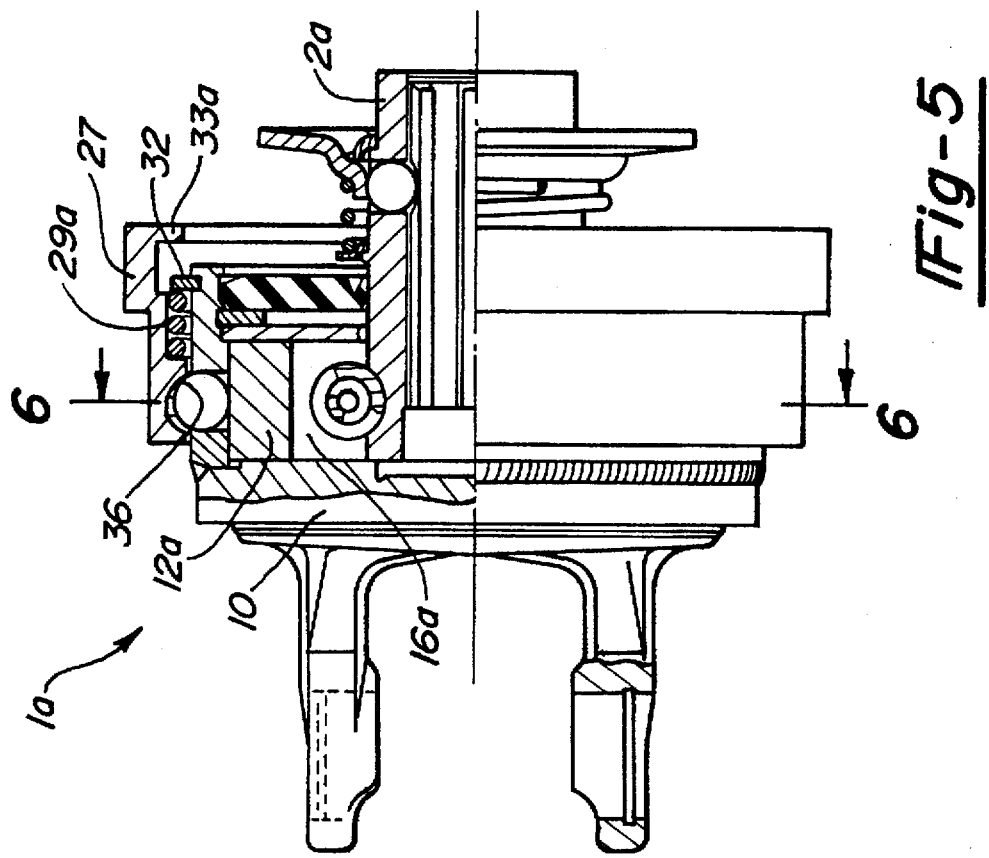
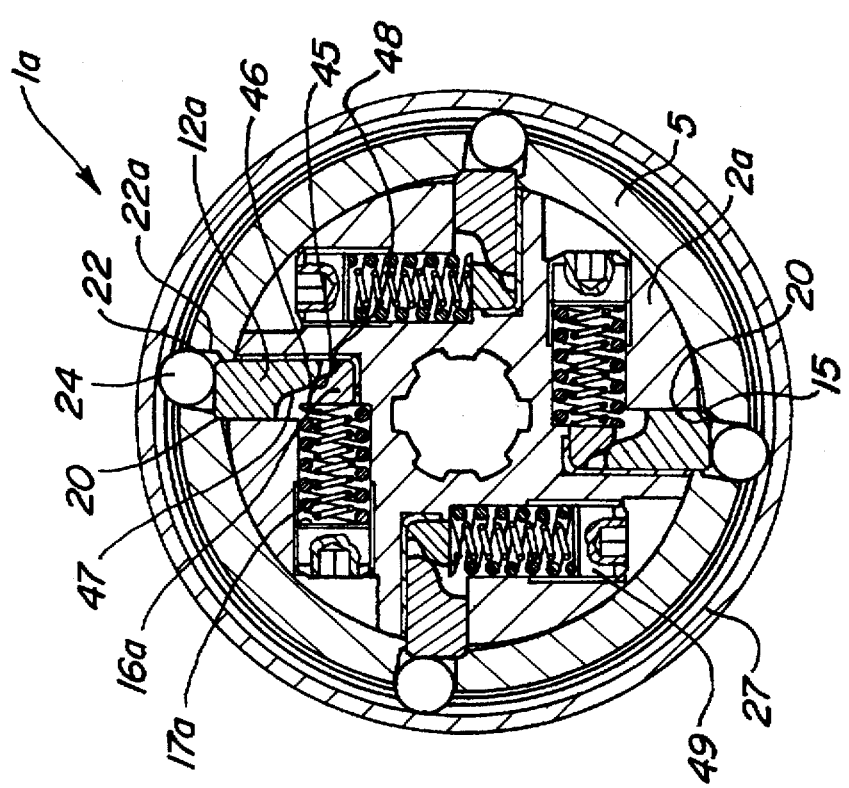

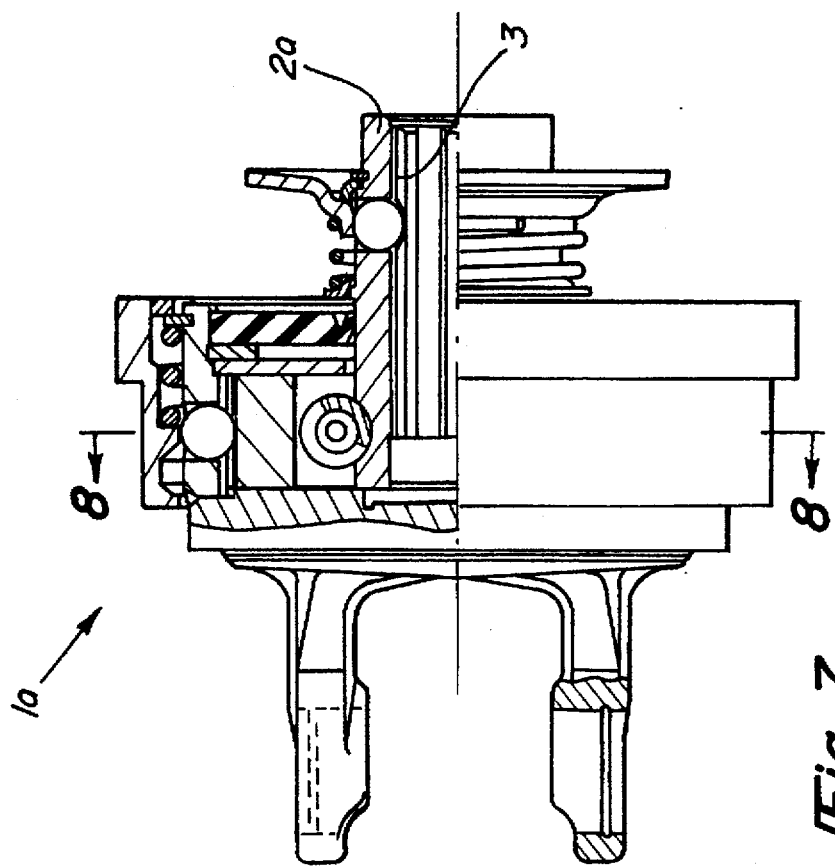
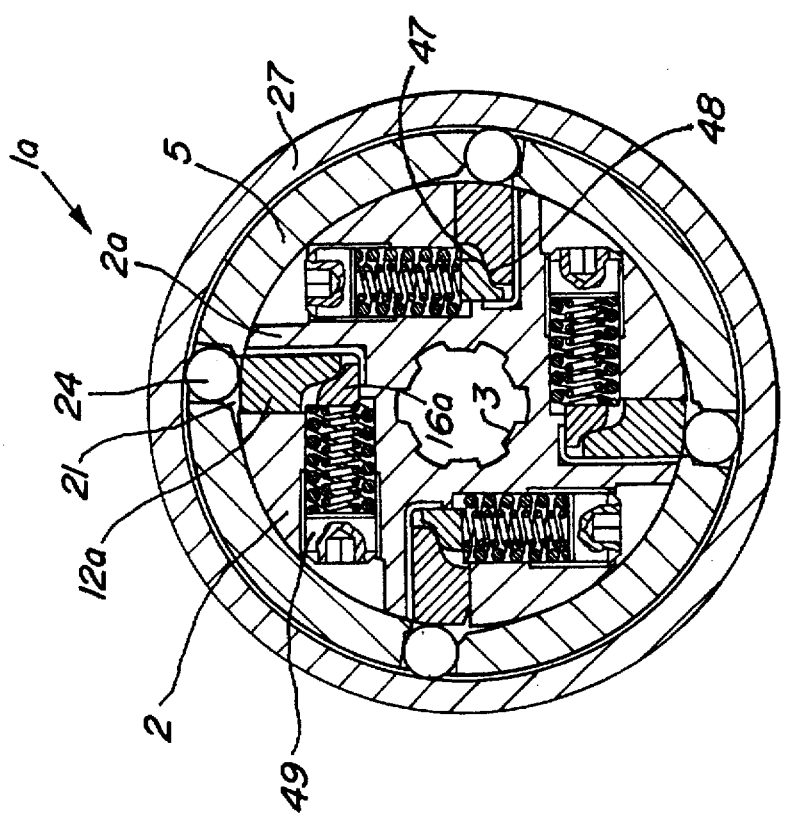

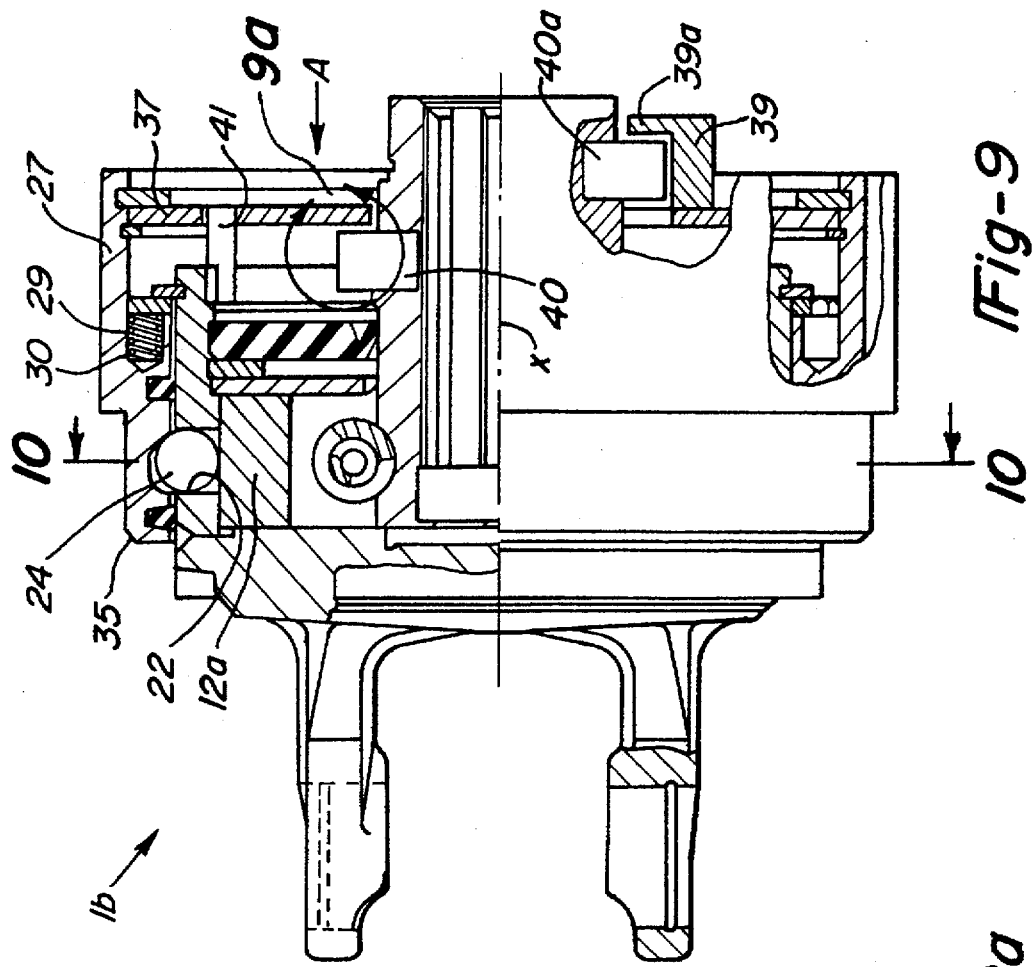
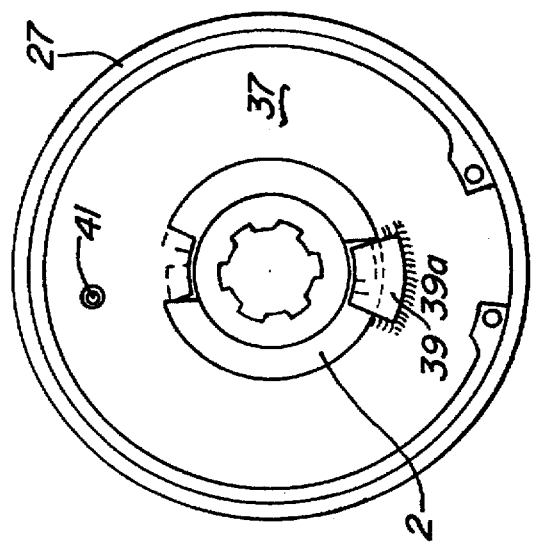
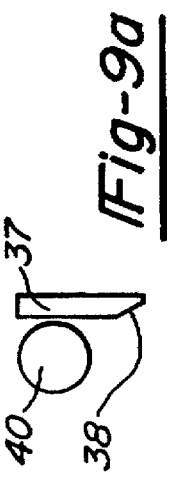

TORQUE LIMITING COUPLING

The invention relates to a coupling, more particularly a torque limiting coupling or freewheeling unit for a driveline driving agricultural implements or machinery. The coupling has a coupling hub which includes a cylindrical bearing face. A coupling sleeve includes a bearing bore with a diameter only slightly greater than the bearing face of the coupling hub. The coupling sleeve is received on the bearing face so as to be rotatable relative to the coupling hub. Driving elements are associated with the coupling hub and are settable between a disconnected position, where they are withdrawn into the coupling hub, and a torque transmitting position, where they partially project from the bearing face of the coupling hub. The driving elements, via a driving face, establish an operating connection with a torque transmitting face in a recess in the wall of the bearing bore of the coupling sleeve to create a torque transmitting possibility between the coupling sleeve and the coupling hub. A setting means pushes the driving elements into the torque transmitting position.

A torque limiting coupling is described in U.S. Pat. No. 5,342,241. The driving elements are loaded by control cams which, in turn, are loaded by springs. The control cams push the driving elements into a torque transmitting position. If a predetermined limit torque is exceeded, the driving elements are disengaged into a position where they are withdrawn into the coupling hub. In the process, the control cam faces and the driving element faces supporting one another are interchanged so that, in the disconnected position, the driving elements are pushed by the springs, acting on the control cams, into the torque transmitting position under the influence of a lower force. The switching faces extend such that the transmission ratio in respect of the conversion of the spring force between the driving elements and control cams is different for the disconnected position and the torque transmitting position. When the relative speed between the coupling hub and coupling sleeve decreases, re-connection takes place automatically as a result of the reduced forces acting on the driving elements. However, in such an embodiment, the driving elements are constantly loaded in the direction of their torque transmitting position. Thus, constant engaging and disengaging processes take place, even if the switching in forces are lower. This leads to a more rapid wear of the driving elements and of the parts participating in the driving process.

SUMMARY OF THE INVENTION

It is an object of the invention to provide a coupling which enables a complete release. The driving elements are transferred into a disconnected position and into a re-connection or torque transmitting position through external steps or through predetermined measures.

In accordance with the invention, the coupling sleeve includes a number of apertures which corresponds to the number of driving elements. The apertures extend from the recesses in the bearing bore to the outer face of the coupling sleeve. A supporting member is adjustably guided in each aperture. When the driving elements are in the torque transmitting position, each supporting member, in a first switched position, is in contact with a supporting face of a driving element via a contact face. The supporting members are loaded by a switching ring through spring means to provide contact with the supporting faces. When the driving elements are transferred into the disconnected position, the switching ring pushes the supporting members, via their contact faces, into a second switched position and prevents the driving elements from returning into the torque transmitting position. Through engagement, the switching ring is returnable into a position which enables a return of the supporting members into the first switched position and a return of the driving elements into the torque transmitting position.

The advantage of this embodiment is that the supporting members prevent the driving elements from entering the associated recess of the coupling sleeve. The coupling sleeve and coupling hub rotate freely around one another without torque transmission.

In a further embodiment, the switching ring is designed to operate by hand by an operator. In order to transfer the switching ring into a re-engagement position, the supporting members return such that the driving elements again enter the recess of the coupling sleeve. This is accomplished by the operator displacing the switching ring.

Alternatively, it is possible, after a certain free rotational path, to ensure re-engagement of the driving elements by automatic means. Here, one switching disc and at least one switching cam are provided. One of the disc or cam is non-rotatably associated with the coupling sleeve, while the other is non-rotatably associated with the coupling hub. Also, one of the two is additionally axially adjustable by means of the switching ring. When the driving elements are in the disconnected position, they are guided so as to be axially non-adjustable relative to one another over a predetermined relative pivot path of the coupling sleeve and coupling hub. When the driving elements reach one of a plurality of certain relative positions relative to one another, the switching ring moves to a set position which enables a transfer of the supporting members into the first switched position, and thus, the driving elements into the torque transmitting position. After a certain relative pivot path has been covered between the coupling sleeve and coupling hub, the switching ring is axially adjusted by the switching disc stopping against a switching cam. The switching ring releases the supporting members in such a way as to enable the driving elements to engage the torque transmitting position. Thus, the coupling sleeve and coupling hub re-engage one another in a certain rotational position.

Advantageously, the supporting members are provided in the form of balls. Thus, the apertures have a cylindrical shape. To limit the radially inwardly directed movement of the balls, the apertures include a stop. If the supporting members are provided in the form of balls, their outer face constitutes the contact face.

On the outer face of the coupling sleeve, the switching ring is axially adjustably guided between the disconnected position and a torque transmitting position. At least one spring is provided which loads the switching ring in the direction of its disconnected position.

In one embodiment of the invention, the switching ring includes a bore portion. In the disconnected position of the driving elements, the bore portion covers the apertures for the supporting members so that they cannot move radially outwardly. The support members are held in their radially inwardly displaced second switched position to prevent radial displacement into the first switched position.

Furthermore, according to a further supplementary feature, the switching ring bore includes an annular recess with a setting face. The annular recess, in the torque transmitting position of the driving elements, covers the apertures in which the supporting members are guided. In this position, the supporting members may move radially outwardly out of the coupling sleeve and enter the annular recess until they are supported on the setting face.

The coupling is preferably a torque transmitting coupling where at least two circumferentially distributed driving elements are pushed into the torque transmitting position by a spring force. After a limit torque has been exceeded, the driving elements are transferred into the disconnected position against the force of the spring. For this purpose, use is made of the mutual supporting faces of the driving elements and of the coupling sleeve. However, in a further embodiment, it is also possible to associate the driving elements with separate control cams, which are loaded by springs. The control cams and driving elements are supported relative to one another by switching faces in the disconnected position and in the torque transmitting position.

From the following detailed description taken in conjunction with the accompanying drawings and subjoined claims, other objects and advantages of the present invention will become apparent to those skilled in the art.

BRIEF DESCRIPTION OF THE DRAWINGS

Different embodiments of the coupling in accordance with the invention are illustrated in the drawing wherein:

FIG. 1 is side view, partially in section, of a first embodiment of a torque limiting coupling in the torque transmitting position in accordance with the present invention.

FIG. 2 is a section view of FIG. 1 along line 2—2 thereof.

FIG. 5 is a side view, in half section, of a modified embodiment of a coupling in a torque transmitting position in accordance with the present invention.

FIG. 6 is a section view of FIG. 5 along line 6—6 thereof.

FIG. 7 is a view like FIG. 5, with the driving elements in the disconnected position.

FIG. 8 is a section view of FIG. 7 along line 8—8 thereof.

FIG. 9 is half a longitudinal section view through a further embodiment of a coupling with an automatic re-connecting means in accordance with the present invention.

FIG. 9a is a detail view of the position of the switching disc and of the switching cam, with the coupling being in the position as shown in FIG. 9.

FIG. 9b is a plan view in the direction of arrow A according to FIG. 9.

DETAILED DESCRIPTION OF THE DRAWINGS

Figure 13:
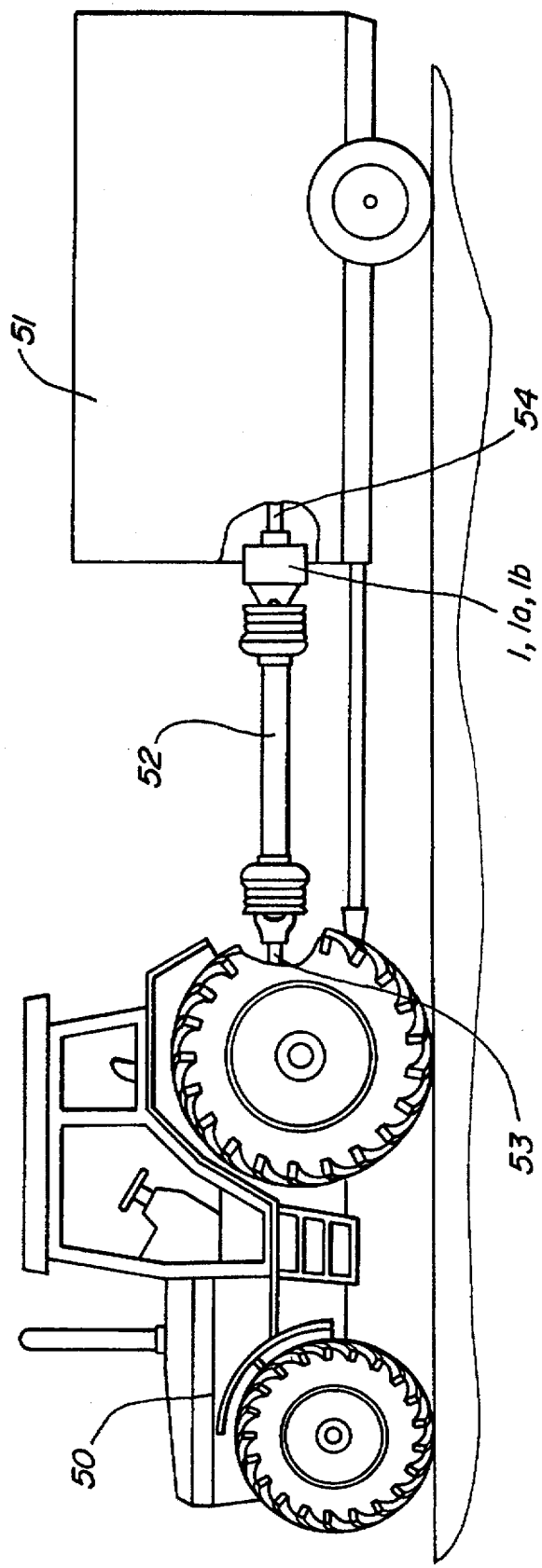
FIG. 13 is a side view of a tractor with an implement attached thereto and driven by a driveshaft.

As can be seen in FIG. 13, the coupling 1, 1a, 1b in accordance with the invention serves to pass on a rotational movement of the power take-off shaft drive of a tractor 50 to an implement 51 via a driveshaft 52. One end of the driveshaft is connected to the tractor power take-off shaft 53, whereas the other end of the driveshaft 52 includes the coupling 1, 1a, 1b. The coupling, through its coupling hub, is slipped onto the driving journal 54 of the implement. The coupling serves to interrupt the torque connection between the driveshaft 52 and the implement 51. In the case of overloading or if the driveshaft drive is disconnected, but with the rotating masses of the implement still running, the torque connection will be interrupted.

A first embodiment of a torque limiting coupling 1 is illustrated in FIGS. 1 to 4. The coupling 1 includes a coupling hub 2 with a slip-on bore 3 to slip onto the driving journal of an implement as shown in FIG. 13. The outer face of the coupling hub is designed as a cylindrical bearing face 4. A coupling sleeve 5 is rotatably supported via its bearing bore 6 on the bearing face 4 of the coupling hub 2. Towards the left, a yoke 10 of a Hook's joint is connected to the coupling sleeve 5. The yoke 10 forms part of a flange which, by welding, is firmly connected to the coupling sleeve 5. An inner face of yoke 10 serves as the contact face 11. The coupling hub 2, via its end face, rests against the contact face 11. Towards the other side, a bearing disc 7 is supported against a radially extending face of the coupling hub 2. The bearing disc 7 is secured against axial displacement by a securing ring 8 inserted into the bearing bore 6 of the coupling sleeve 5. In this way, the coupling sleeve 5 is held on the coupling hub 2 so as to be secured against axial displacement. Furthermore, a seal 9 seals the interior of the coupling towards the outside.

In the direction towards the yoke 10, the coupling hub 2 includes two radially extending bearing apertures 13. The apertures 13 are engaged by sleeves 14 which include a radially displaceable driving element 12. At one end, the end facing the coupling sleeve 5, each driving element 12 includes a driving face 15. The driving face 15 extends at an angle relative to the axis of displacement of the driving elements 12. At the radially inner end, the driving elements 12 are loaded by control cams 16. The control cams 16 are offset by 90° around the rotational axis X relative to the driving elements 12. Thus, the control cams 16 are offset outwardly towards the torque transmitting position. Two control cams 16 load the driving elements 12 radially outwardly. The control cams 16 are adjustable on a common pin 18 and are pushed by the springs 17 radially inwardly towards the driving elements 12. Nuts 19 provide a supporting base for the springs 17 and are threaded from the outside onto the pins 18.

On the circumference of the bearing bore 6, the coupling sleeve 5 includes four recesses 21 offset by 90°. The recesses 21 include torque transmitting faces 20 corresponding to the driving faces 15 of the driving elements 12. The driving elements 12 are loaded towards the torque transmitting faces 20 by the control cams 16 and the springs 17. Radially outwardly, the recesses 21 are followed by apertures 22 which are open towards the bearing face 4 of the coupling hub 5. The apertures 22 constitute cylindrical bores which, towards the radial inside, include stop faces 22a. The apertures 22 accommodate balls 24 which constitute supporting members. When the driving elements 12 are in the torque transmitting position, they project outwardly beyond the bearing face 4 of the coupling hub 5. Because of the arrangement of the recesses 21 in four different rotational positions of the coupling sleeve 5 and coupling hub 2 relative to one another, the driving elements 12 may be transferred into the torque transmitting position.

A switching ring 27 is axially adjustably supported on the cylindrical outer face 23 of the coupling sleeve 5. The switching ring 27, via its bore 28, is positioned on the outer face 23. When the driving elements 12 are in the torque transmitting position, their torque transmitting faces 20 are supported on the driving face 15 of the driving element 12 constituting the driving part, the balls 24, via their outer faces which constitute the contact faces 25, are supported on the outer supporting faces 26 of the driving elements 12.

Furthermore, via the contact faces 25, the balls 24 are supported on a setting face 36 of the switching ring 27. The setting face 36 is formed in an annular recess 35 of the switching ring 27. The setting face 36 extends at an angle relative to a plane containing the axis of adjustment of the driving elements 12 and of the control cams 16. In the region adjoining the annular recess 35, the switching ring 27, in its bore 28, includes a bore portion 34 whose diameter is only slightly greater than the diameter of the outer face 23 of the coupling sleeve 5. The switching ring 27 may be guided on the outer face 23, with sliding rings or seals arranged therebetween, however, the switching ring 27 may also be guided directly on the outer face 23.

A bore step of the switching ring 27 accommodates a supporting ring 31. The supporting ring 31 is supported against a securing ring 32 which engages a groove in the outer face 23 of the coupling sleeve 5. Furthermore, the switching ring 27 includes circumferentially distributed bores 30 to receive springs 29. The springs 29 act in the direction of the longitudinal and rotational axis X. The springs 29 are supported on the bore base of the bore 30, on the one hand, and against the supporting ring 31 on the other hand. Thus, the switching ring 27 according to FIG. 1 is pushed towards the left, with its setting face 36 coming into contact with the balls 24.

At an axial distance from the supporting ring 31 a stop ring 33 is positioned in the bore of the switching ring 27. The stop ring 33 is fixed relative to the switching ring 27 and limits the movement of the switching ring 27 in the axial direction of the rotational axis X towards the left. The stop ring 33 limits the movement of the switching ring 27 when it comes to contact the securing ring 32.

Figure 3:
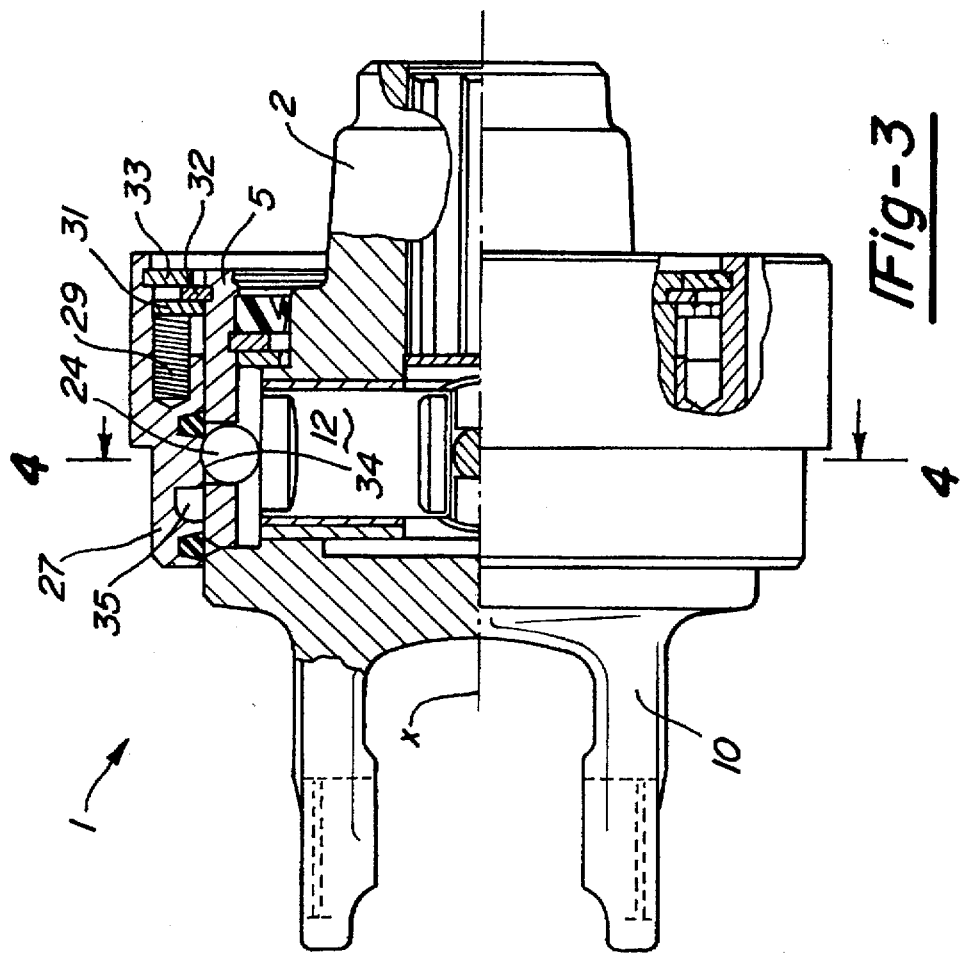
FIG. 3 is a side view like FIG. 1, with the driving elements in the disconnected position.
Figure 4:
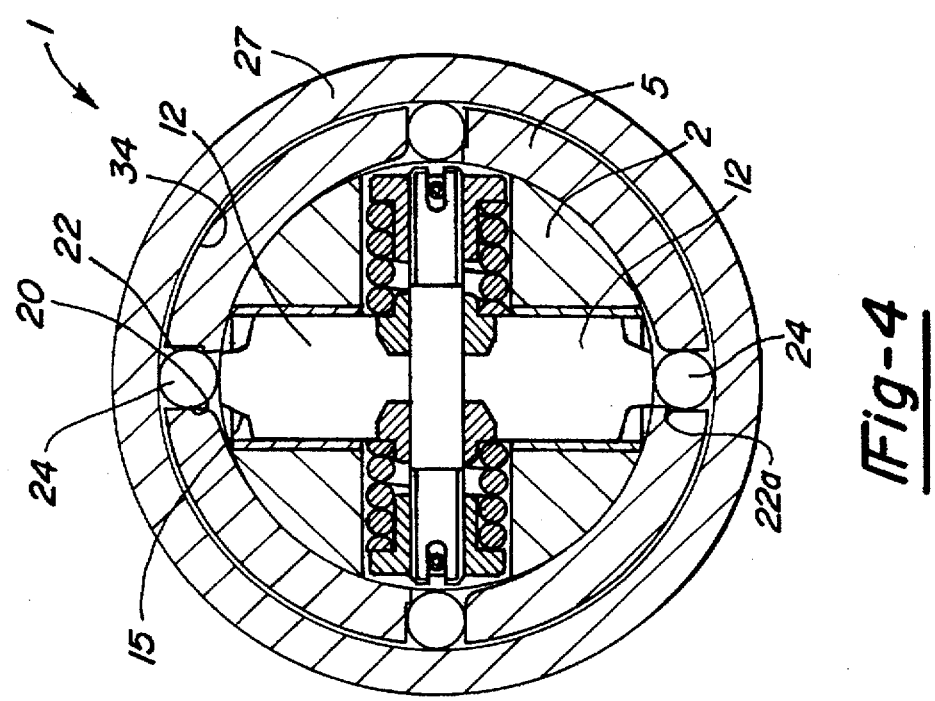
FIG. 4 is a section view of FIG. 3 along line 4—4 thereof.

If in the implement to be driven, a blockage or any other case of overloading occurs, the driving coupling sleeve 5 tries to overtake the coupling hub 2. When a set torque limit is exceeded, the driving elements 12 escape radially inwardly against the outwardly directed force applied to them by the control cams 16 and the springs 17 loading the control cams 16, until the supporting faces 26 are positioned inside the bearing bore 6 of the coupling sleeve 5. As a result of the force of the springs 29 acting on the switching ring 27 and due to the contact with the setting faces 36, the balls 24 are adjusted radially inwardly. The adjustment continues until the inwardly directed movement is limited by the stops 22a. In this position, the switching ring 27 can be displaced towards the left until the bore portion 34 covers the apertures 22. Thus, the balls 24 are prevented from moving radially outwardly. In the process, starting from FIGS. 1 and 2, the position as illustrated in FIGS. 3 and 4 is reached.

Re-engagement of the coupling 1 is possible only if a force in the sense of a displacement against the force of the spring 29 is applied to the switching ring by hand. Upon simultaneous activation of the drive, when a rotational movement of the coupling sleeve 5 relative to the coupling hub 2 is initiated, the driving elements 12, when a corresponding position relative to the recesses 21 has been reached, may again be adjusted radially outwardly due to force of the spring 17 until driving faces 15 contact the torque transmitting faces 20 of the coupling sleeve 5. In the process, the balls 24 are pushed radially outwardly because the supporting face 26 abuts the outer face 25 of the balls 24 and moves the balls 24 into the annular recess 35 of the switching ring 27. When the operator releases the switching ring 27, the springs 29 move the setting face 36 of the switching ring 27 until it contacts the balls 24. When the driving elements 12 are in the disconnected position, when the balls 24 are prevented by the switching ring 27 from moving radially outwardly by being supported on the bore portion 34, the balls 24 prevent the driving elements 12 from entering the recesses 21. As there is provided a total of four recesses 21, in each case, only two recesses 21, offset by 180°, are occupied by driving elements in the torque transmitting position, whereas the other two recesses 21 remain free. The balls 24 associated with these, under the influence of the centrifugal force, outwardly rest against the setting face 36 of the switching ring 27 when the coupling 1 rotates.

The coupling 1a according to FIGS. 5 to 8 deviates from the coupling embodiment according to FIGS. 1 to 4 in that the driving elements 12a are loaded by control cams 16a which are adjustably arranged in coupling hub apertures rectangularly relative to the driving elements 12a. The control cams 16a are also loaded by springs 17a. The springs 17a are supported against setting screws 49. The springs 17a load the control cams 16a towards the driving elements 12a. The control cams 16a and the driving elements 12a include switching faces 45, 46, 47, 48. In FIGS. 5 and 6, illustrating the torque transmitting position, the switching face 45 of the driving element 12a is supported against the switching face 46 of the control cam 16a. The switching faces 45, 46 extend such that, taking into account the force of the springs 17a and the inclination of the driving face 15 and the torque transmitting face 20, a supposing force is achieved which corresponds to a certain torque limit at which the driving elements 12a are transferred from their torque transmitting position, as illustrated in FIGS. 5 and 6, into the disconnected position, shown in FIGS. 7 and 8. In the process, the contact conditions of control cams 16a and driving elements 12 relative to one another change. The switching faces 47 and 48 come into contact with one another, but they are inclined such that only a reduced returning force acts on the driving elements. The return force is responsible for a displacement radially outwardly.

The design of the switching ring 27 substantially corresponds to that of the coupling 1 according to FIGS. 1 to 4. However, only one spring 29a is provided to adjust the switching ring 27. Furthermore, the stop ring 33a forms part of the switching ring 27. The spring 29a is directly supported on the securing ring 32. In the torque transmitting position according to FIGS. 5 and 6, the balls 24 are loaded by the switching ring 27 and its setting face 36.

When overloading occurs and the driving elements 12a are moved radially inwardly into their position where they are withdrawn into the coupling hub 2a, the balls 24, in their apertures 22, too, are pushed radially inwardly until they come to rest against the stops 22a. As a result, the balls prevent the driving elements 12a from entering the recesses 21 and thus from coming into contact with the torque transmitting faces 20 of the coupling sleeve 5. In the case of the coupling 1a, it includes a total of four driving elements 12a.

FIGS. 9 to 12 show a further embodiment of a coupling as obtained from FIGS. 5 to 8. However, the switching ring 27, as regards the arrangement of the springs 29 loading the switching ring 27, is designed as shown in FIGS. 1 to 4. The switching ring 27 includes an annular recess 35 with a setting face 36. Also, switching ring 27 is axially adjustably arranged on the outer face of the coupling sleeve. Further, circumferentially distributed springs 29 are arranged in bores 30.

A switching disc 37 is associated with the switching ring 27 at a bore provided at its end facing away from the annular recess 35. The switching disc 37 is axially firmly connected to the switching ring 27. Two securing rings 42, 43 are provided accommodating the switching disc 37 between them. Furthermore, a guiding pin 41 extends parallel to the axis X and extends through an aperture 44 in the switching disc 37. Thus, the switching disc 37 is held non-rotatably relative to the coupling sleeve 5.

In addition, the switching disc 37 includes circumferentially distributed switching faces 38. One of the switching faces 38 is directly associated with the switching disc 37, while the other one is associated with a projection 39 and with a connected switching collar 39a. The switching faces 38 are arranged such that, relative to two switching cams 40, 40a associated with the coupling hub in an offset way along the axis X, the switching faces 38 are able to carry out a relative rotational movement along a predetermined pivot path. However, in those situations where the position of the driving elements 12a coincide with the corresponding recesses 21, the switching faces 38 stop against the switching cams 40, 40a and act on the switching ring 27 in the sense of an axial adjustment if the coupling sleeve 5 continues to rotate relative to the coupling hub 2b.

Figure 11:
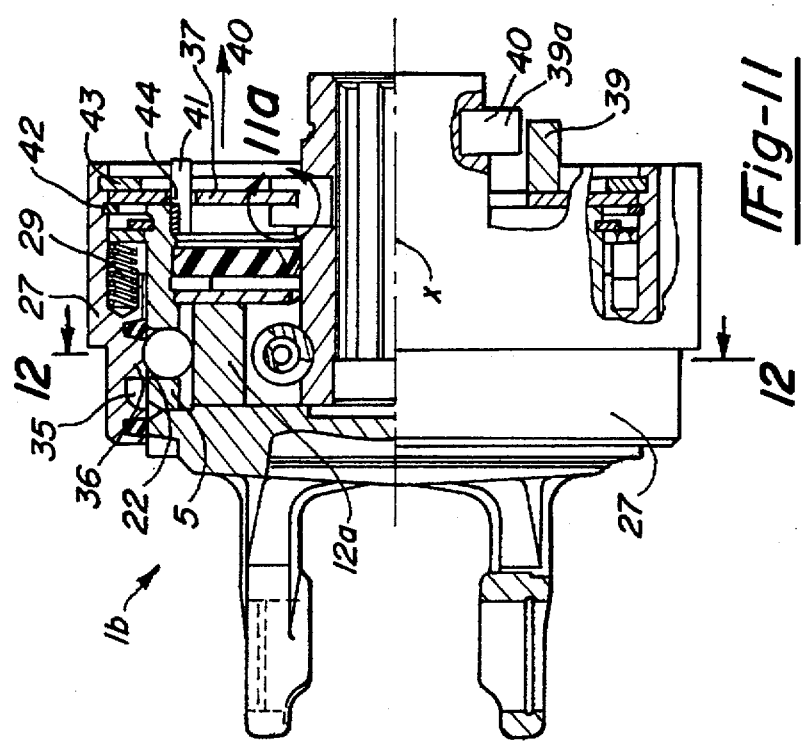
FIG. 11 is a view like FIG. 9 in the disconnected position.
Figure 11A:
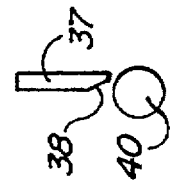
Figure 10:
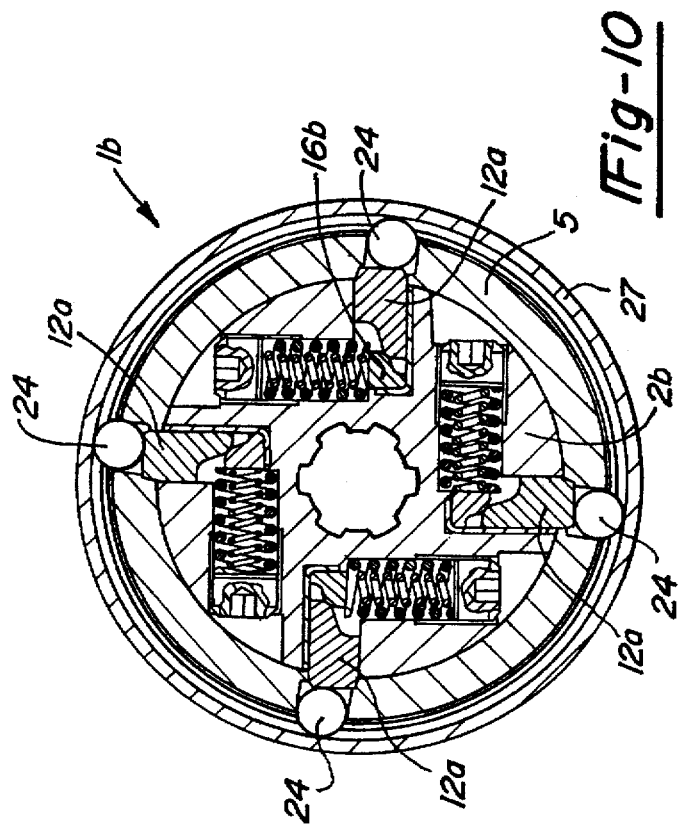
FIG. 10 is a cross-section view of FIG. 9 along line 10—10 thereof.
Figure 12:
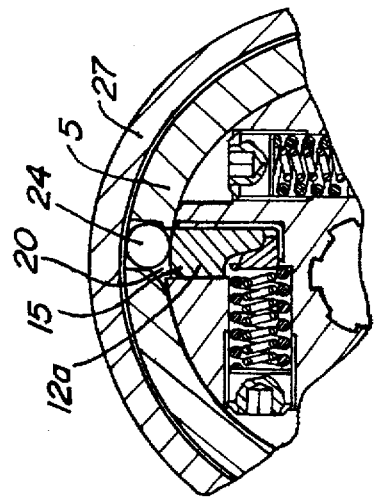
FIG. 12 is part of a cross-section view along line 12—12 thereof.

In the operation process, the switching ring 27 on the coupling sleeve 5 is transferred from its disconnected position illustrated in FIGS. 11 and 12, into a displaced position towards the right, as seen in FIGS. 9 and 10. Furthermore, starting from its position shown in FIG. 11a, relative to the switching cam 40, the switching ring is transferred into the position according to FIG. 9a. This position is also shown by FIG. 9b. While the switching ring 27 is transferred into a position displaced towards the right, the driving elements 12a are able to enter the recesses 21. The driving elements 12a are displaced radially outwardly until the driving faces 15 come into contact with the torque transmitting faces 20 and until the balls 24 load the setting face 36. This ensures that the switching ring is axially displaced by a further small amount, so that the switching disc 37 is arranged with play relative to the switching cams 40 and 40a, respectively. This position is also shown in FIG. 9b.

If an overload occurs, the switching ring 27 is transferred from the position as shown in FIGS. 9, 9a and 10 into the position according to FIGS. 11 and 12a. Thus, the torque acting on the coupling sleeve 5 transfers the driving elements 12a into the withdrawn position in the coupling hub 2b because a higher counter torque acts on the coupling hub 2b. As a result of the force of the springs 29, the switching ring may then be displaced towards the left from the position shown in FIG. 9 so that the balls 24 are pushed radially inwardly. The bore portions 34 cover the balls and the apertures 22, respectively.

While the above detailed description describes the preferred embodiment of the present invention, the invention is susceptible to modification, variation and alteration without deviating from the scope and fair meaning of the subjoined claims.

We claim:

1. A coupling comprising:

a coupling hub including a cylindrical bearing face;

a coupling sleeve including a bearing bore with a diameter only slightly greater than the bearing face of the coupling hub and is received on the bearing face so as to be rotatable relative to the coupling hub;

driving elements associated with the coupling hub, said driving elements being settable between a disconnected position where they are withdrawn into the coupling hub and a torque transmitting position where they partially project beyond the bearing face of the coupling hub via a driving face on said driving elements, said driving face establishing an operating connection with a torque transmitting face in a recess in the wall of the bearing bore of the coupling sleeve for creating a torque transmitting possibility between the coupling sleeve and the coupling hub;

setting means which push the driving elements into the torque transmitting position;

a plurality of apertures in said coupling sleeve corresponding to the number of driving elements, said plurality of apertures extend from the recesses in the bearing bore to an outer face of the coupling sleeve;

a supporting member is adjustably guided in each aperture that when the driving elements are in the torque transmitting position, each supporting member, in a first switched position, is in contact with a supporting face of the driving element by a contact face of the supporting member;

a spring mechanism for providing force on said driving elements which in turn contact the supporting members, said supporting members coupled with a switching ring, said switching ring pushes the supporting members into a second switched position and prevents the driving elements from returning into the torque transmitting position, and the switching ring returning to an engagable position where the supporting members are forced into the first switched position thereby allowing the driving elements to return into the torque transmitting position.

2. A coupling according to claim 1, wherein the switching ring is operated by hand by an operator.

3. A coupling according to claim 1, further including one switching disc and at least one switching cam, wherein one of said switching disc and switching cam is non-rotatably associated with the coupling sleeve, the other of said switching disc and switching cam being non-rotatably associated with the coupling hub, and with one of said switching disc and switching cam being axially adjustable by said switching ring, and when the driving elements are in the disconnected position, the driving elements are guided so as to be axially non-adjustable relative to one another over a predetermined relative pivot path of the coupling sleeve and the coupling hub and, when reaching one or a plurality of certain relative positions relative to one another, enable the switching ring to be set to a position which enables a transfer of the supporting members into the first switched position and thus of the driving elements into the torque transmitting position.

4. A coupling according to claim 1, wherein the supporting members are in the form of balls.

5. A coupling according to claim 4, wherein the outer faces of the balls constitute the contact faces.

6. A coupling according to claim 1, wherein the plurality of apertures, on their radial insides, include a stop for radially limiting the movement of the supporting members on to the coupling hub.

7. A coupling according to claim 1, wherein the switching ring is axially adjustably guided on the outer face of the coupling sleeve between the disconnected position of the driving elements and the torque transmitting position of the driving elements and said switching ring being loaded by at least one switching ring return spring in the direction of its disconnected position.

8. A coupling according to claim 7, wherein the switching ring includes a bore portion which, in the disconnected position of the driving elements, covers the plurality of apertures for the supporting members and retains the driving elements radially inward at the second switched position of the supporting members to prevent the supporting members from being radially displaced towards the first switched position.

9. A coupling according to claim 7, wherein in its bore, the switching ring includes an annular recess with a setting face, with the switching ring in the torque transmitting position, the annular recess in the switching ring covers the plurality of apertures in which the supporting members are guided and, in this position, the supporting members project radially outwardly beyond the coupling sleeve and extend into the annular recess and are supported on the setting face.

10. A coupling according to claim 1, wherein at least two of the circumferentially distributed driving elements, by a spring force, are pushed into the torque transmitting position and, after a torque limit has been exceeded, are transferred into the disconnected position against the force of the spring.

11. A coupling according to claim 10, wherein the driving elements are associated with control cams which are loaded by springs and the control cams and driving elements are supported relative to one another by one set of control cam and driving element switching faces in the torque transmitting position and another set of control cam and driving element switching faces in the disconnected position.

12. A coupling according to claim 1, wherein at least two circumferentially distributed driving elements are pushed into the torque transmitting position by the force of a spring, but in the case of a relative movement against the direction of rotation, are transferred into a withdrawn position in the coupling hub for torque transmitting purposes.

* * * * *

UNITED STATES PATENT AND TRADEMARK OFFICE
CERTIFICATE OF CORRECTION

PATENT NO. : 5,718,634
DATED : February 17, 1998
INVENTOR(S) : Felix Mikeska, Klaus Kämpf, Hans-Jürgen Langen It is certified that error appears in the above-identified patent and that said Letters Patent is hereby corrected as shown below:

Column 6, line 24, "supposing" should be --supporting--

Column 7, line 37, "12a" should be --12--

Signed and Sealed this

Ninth Day of June, 1998

Attest:

BRUCE LEHMAN

Attesting Officer

Commissioner of Patents and Trademarks